(12) United States Patent
Dun (10) Patent No.: US 10,861,049 B2
(45) Date of Patent: Dec. 8, 2020

(54) GLOBAL-SCALE WIRELESS ID MARKETING REGISTRY SYSTEM FOR MOBILE DEVICE PROXIMITY MARKETING

(71) Applicant: Dynasign Corporation, Fremont, CA (US)

(72) Inventor: Jimmy J. Dun, Bridgewater, NJ (US)

(73) Assignee: Dynasign Corporation, Fremont, CA (US)

( * ) Notice: Subject to any disclaimer, the term of this patent is extended or adjusted under 35 U.S.C. 154(b) by 627 days.

(21) Appl. No.: 15/344,473

(22) Filed: Nov. 4, 2016

(65) Prior Publication Data
US 2018/0130096 A1 May 10, 2018

(51) Int. Cl.
*G06Q 30/02* (2012.01)
*H04L 29/08* (2006.01)
(Continued)

(52) U.S. Cl.
CPC ..... *G06Q 30/0267* (2013.01); *G06Q 30/0261* (2013.01); *H04L 67/02* (2013.01);
(Continued)

(58) Field of Classification Search
CPC .................................. G06Q 30/0207–0277
See application file for complete search history.

(56) References Cited

U.S. PATENT DOCUMENTS 9,213,675 B1 * 12/2015 Kolton .................. H04W 4/21
9,491,577 B1 * 11/2016 Jones ..................... G06F 16/29
(Continued)

FOREIGN PATENT DOCUMENTS

CN 101449555 A * 6/2009 ............ H04L 29/08
GB 2356321 A * 5/2001 ............ H04W 88/02
(Continued)

OTHER PUBLICATIONS

Infrastructure-assisted Geofencing: Proactive Location-based Services with Thin Mobile Clients and Smart Servers; Garzon et al., 2015 3rd IEEE International Conference on Mobile Cloud Computing, Services, and Engineering.*
(Continued)

*Primary Examiner* — David J Stoltenberg
(74) *Attorney, Agent, or Firm* — Invent Capture, LLC.; Samuel S. Cho (57) ABSTRACT

A wireless identification (WiD) marketing registry system for mobile device proximity marketing and a method of operating the system are disclosed. In one embodiment, the WiD marketing registry system includes a mobile device executing a global WiD mobile application that scans for the nearest global WiD marketing signal, which is extracted to identify a particular WiD code. This particular WiD code acts as a key in a database for retrieval of a URL or a location proximity marketing content, which can be displayed on the mobile electronic device by the global WiD mobile application with an associated consumer marketing user interface. The WiD marketing registry system also includes a WiD signal source device located near the mobile electronic device, a wireless data network, and a global WiD marketing registry management system that accommodates global marketing WiD code queries, URL retrievals, marketing dataset retrievals, and WiD-URL pairing initialization and updates.

18 Claims, 5 Drawing Sheets

An Embodiment of a Global-Scale Wireless ID Marketing Registry System for Mobile Device Proximity Marketing
100

(51) Int. Cl.
*H04L 29/06* (2006.01)
*H04W 4/80* (2018.01)
*H04W 88/02* (2009.01)
*H04W 84/12* (2009.01)
*H04W 88/08* (2009.01)

(52) U.S. Cl.
CPC .............. *H04L 67/10* (2013.01); *H04L 67/42* (2013.01); *H04W 4/80* (2018.02); *H04W 84/12* (2013.01); *H04W 88/02* (2013.01); *H04W 88/08* (2013.01)

(56) References Cited

U.S. PATENT DOCUMENTS

| | | | | |
|---|---|---|---|---|
| 2001/0018349 A1* | 8/2001 | Kinnunen | ............. | H04W 4/029 455/456.3 |
| 2003/0004802 A1* | 1/2003 | Callegari | ............. | G06Q 30/02 705/14.13 |
| 2006/0206610 A1* | 9/2006 | Ling | ............. | H04L 67/18 709/226 |
| 2006/0221918 A1* | 10/2006 | Wang | ............. | H04W 4/029 370/338 |
| 2007/0026871 A1* | 2/2007 | Wager | ............. | H04L 67/20 455/456.1 |
| 2007/0149212 A1 | 6/2007 | Gupta et al. | | |
| 2007/0262860 A1* | 11/2007 | Salinas | ............. | G06Q 30/02 340/539.12 |
| 2008/0040219 A1* | 2/2008 | Kim | ............. | G06Q 30/02 705/14.26 |
| 2008/0072139 A1* | 3/2008 | Salinas | ............. | G06F 16/9577 715/238 |
| 2008/0160966 A1 | 7/2008 | Mckiou et al. | | |
| 2008/0167991 A1* | 7/2008 | Carlson | ............. | G06Q 30/0215 705/50 |
| 2008/0262928 A1* | 10/2008 | Michaelis | ............. | G06Q 30/02 705/14.26 |
| 2008/0268876 A1* | 10/2008 | Gelfand | ............. | G06Q 30/02 455/457 |
| 2009/0205000 A1* | 8/2009 | Christensen | ............. | G11B 27/10 725/61 |
| 2010/0151821 A1 | 6/2010 | Sweeney et al. | | |
| 2010/0197323 A1 | 8/2010 | Freeburg et al. | | |
| 2010/0250351 A1* | 9/2010 | Gillenson | ............. | G06Q 30/02 705/14.13 |
| 2010/0250359 A1* | 9/2010 | Gillenson | ............. | G06Q 30/02 705/14.25 |
| 2010/0269058 A1* | 10/2010 | Othmer | ............. | G06Q 30/0243 715/774 |
| 2011/0238192 A1* | 9/2011 | Shah | ............. | G10L 19/018 700/94 |
| 2012/0221392 A1* | 8/2012 | Baker | ............. | G06Q 30/0207 705/14.17 |
| 2012/0271442 A1* | 10/2012 | Shah | ............. | G10L 19/018 700/94 |
| 2012/0303147 A1* | 11/2012 | Shah | ............. | G10L 19/018 700/94 |
| 2013/0072234 A1* | 3/2013 | Morrison | ............. | H04W 4/029 455/456.3 |
| 2013/0073388 A1* | 3/2013 | Heath | ............. | G06Q 50/01 705/14.53 |
| 2013/0084859 A1* | 4/2013 | Azar | ............. | H04W 48/08 455/435.1 |
| 2013/0191213 A1* | 7/2013 | Beck | ............. | G06Q 30/0267 705/14.53 |
| 2013/0204415 A1* | 8/2013 | Fregley | ............. | G06Q 30/02 700/94 |
| 2013/0275221 A1* | 10/2013 | Zeto, III | ............. | G06Q 30/02 705/14.58 |
| 2013/0281084 A1* | 10/2013 | Batada | ............. | H04W 4/80 455/426.1 |
| 2013/0290106 A1* | 10/2013 | Bradley | ............. | G06Q 90/20 705/14.64 |
| 2013/0297422 A1* | 11/2013 | Hunter | ............. | G06Q 30/0261 705/14.58 |
| 2013/0317944 A1* | 11/2013 | Huang | ............. | G01S 5/0263 705/26.61 |
| 2014/0066101 A1 | 3/2014 | Lyman et al. | | |
| 2014/0274150 A1* | 9/2014 | Marti | ............. | H04W 8/18 455/456.3 |
| 2014/0379480 A1* | 12/2014 | Rao | ............. | G06F 8/00 705/14.58 |
| 2014/0380393 A1* | 12/2014 | Christensen | ............. | H04N 21/4345 725/115 |
| 2015/0051975 A1* | 2/2015 | Kadous | ............. | G06Q 30/0261 705/14.58 |
| 2015/0095124 A1* | 4/2015 | Felt | ............. | G06Q 30/0259 705/14.5 |
| 2015/0120408 A1* | 4/2015 | Liu | ............. | H04W 4/021 705/14.12 |
| 2015/0201306 A1* | 7/2015 | Kazemi | ............. | G01S 5/0252 455/456.1 |
| 2015/0205877 A1* | 7/2015 | Rhoads | ............. | G06F 21/10 707/723 |
| 2015/0254704 A1* | 9/2015 | Kothe | ............. | G06Q 30/0276 705/14.26 |
| 2015/0262237 A1* | 9/2015 | Skiba | ............. | G06Q 30/0261 705/14.58 |
| 2015/0312715 A1* | 10/2015 | Haavisto | ............. | H04W 4/021 455/456.3 |
| 2015/0373492 A1 | 12/2015 | Appachi | | |
| 2015/0379576 A1* | 12/2015 | Otis | ............. | G06Q 30/0277 705/14.53 |
| 2016/0044457 A1* | 2/2016 | Marti | ............. | H04W 8/18 455/456.1 |
| 2016/0048827 A1* | 2/2016 | Corbalis | ............. | G06Q 20/3278 705/71 |
| 2016/0048878 A1* | 2/2016 | Corbalis | ............. | H04M 1/7253 705/14.58 |
| 2016/0094598 A1* | 3/2016 | Gedikian | ............. | H04W 4/021 455/456.3 |
| 2016/0119749 A1* | 4/2016 | Moldavsky | ............. | H04W 4/025 455/456.3 |
| 2016/0140614 A1* | 5/2016 | Brubaker | ............. | G06Q 30/02 705/14.46 |
| 2016/0165283 A1* | 6/2016 | Christensen | ............. | H04N 21/4345 725/109 |
| 2016/0171486 A1* | 6/2016 | Wagner | ............. | G06Q 20/12 705/39 |
| 2016/0203522 A1* | 7/2016 | Shiffert | ............. | H04W 76/14 705/14.58 |
| 2016/0232515 A1* | 8/2016 | Jhas | ............. | G06Q 20/3224 |
| 2016/0253624 A1* | 9/2016 | Sims | ............. | H04W 4/80 705/333 |
| 2016/0277999 A1* | 9/2016 | Graves | ............. | H04L 67/20 |
| 2017/0032419 A1* | 2/2017 | Warwas | ............. | G06Q 30/0261 |
| 2017/0070852 A1* | 3/2017 | Marti | ............. | H04W 40/244 |
| 2017/0111763 A1* | 4/2017 | Morgan | ............. | H04B 7/0697 |
| 2017/0132665 A1* | 5/2017 | Hampel | ............. | H04W 4/12 |
| 2017/0245106 A1* | 8/2017 | Connelly | ............. | H04L 65/602 |
| 2018/0032997 A1* | 2/2018 | Gordon | ............. | G06Q 20/3224 |
| 2018/0167771 A1* | 6/2018 | Kazemi | ............. | H04W 4/022 |
| 2019/0340876 A1* | 11/2019 | Northrup | ............. | H04L 63/08 |
| 2020/0162842 A1* | 5/2020 | Jones | ............. | H04L 61/609 |

FOREIGN PATENT DOCUMENTS

WO WO 2016/154009 A1 * 9/2016 .............. H04L 29/08
WO WO 2017/066188 A1 * 4/2017 .............. H04W 4/02

OTHER PUBLICATIONS

About location-aware mobile messages. Expert system based on WiFi spots; Namiot et al., 2011 Fifth International Conference on Next Generation Mobile Applications and Services.*

* cited by examiner

An Embodiment of a Global-Scale Wireless ID Marketing Registry System for Mobile Device Proximity Marketing

An Embodiment of a Dataflow for a Global-Scale Wireless ID Marketing Registry System for Mobile Device Proximity Marketing

| Global Marketing WiD Code | Registration Status | Mobile Device Proximity Marketing URL Address |
|---|---|---|
| WB7A89A112AY | Initial Reg. on 9/27/2016 | http://www.bmwusa.com/5seriesspecialoffer |
| A24SNAJ138K8 | Updated on 8/15/2016 | http://www.watchesuwant.com |
| YMF81AB91RE7 | Not Registered | |
| 1BE2454AEVN3 | Updated on 6/20/2016 | http://www.discountandroidphone.com |

An Example of Paired Global Marketing WiD and Marketing Content URL and/or Datasets in a Global-Scale Wireless ID Marketing Registry System for Mobile Device Proximity Marketing

An Example of WiD Signal Sources in a Global-Scale Wireless ID Marketing Registry System for Mobile Device Proximity Marketing

An Example of a UI Screenshot from a Global WiD Mobile App in a Global-Scale Wireless ID Marketing Registry System for Mobile Device Proximity Marketing

An Operational Flowchart for a Global-Scale Wireless ID Marketing Registry System for Mobile Device Proximity Marketing

GLOBAL-SCALE WIRELESS ID MARKETING REGISTRY SYSTEM FOR MOBILE DEVICE PROXIMITY MARKETING

BACKGROUND OF THE INVENTION

The present invention generally relates to information marketing and advertisement on mobile and consumer electronics devices. More specifically, the present invention relates to global-scale wireless identification (ID) marketing registry systems for mobile device proximity marketing and methods of operating such systems. Furthermore, the present invention also relates to systems and methods for providing and operating auxiliary electronic devices located near mobile devices to present proximity-based supplementary marketing and advertising that may add or enhance visual and/or aural details to the mobile device proximity marketing.

Location-based advertising and marketing services and systems have been gaining interest as a potentially important area for business growth by numerous wireless service providers, mobile device manufacturers, and advertising entities in recent years. Today's conventional location-based advertising and marketing services and solutions typically involve global positioning system (GPS) signals, cellular base station signals, or other geolocation signals that are interpreted by a mobile device as a unique geolocation information, after which localized advertising information associated with the unique geolocation information is transmitted and displayed by the mobile device utilized by a consumer.

Unfortunately, market uptake and proliferation of location-based advertising services have been more elusive than industry experts' initial expectations, due to several drawbacks and disincentives associated with conventional location-based advertising services. For example, conventional location-based advertising services often require a consumer's mobile device to keep its GPS receiver on, while also compromising the user's privacy by requiring the consumer's mobile device to keep its real-time location information open to unknown and potentially-dangerous third-party entities. Privacy-conscious consumers often opt to avoid substantial risk associated with such conventional location-based advertising services by restricting user privacy options, real-time location tracking, and/or GPS receiver functions on their mobile devices.

Furthermore, keeping the GPS receiver and other location-based advertising service feature turned on often drains the battery faster than keeping them off, thus further exacerbating consumers' reluctance to utilize conventional location-based advertising services as their standard mode of mobile device operation. Moreover, conventional location-based advertising services often require cumbersome and battery-draining aftermarket installation and execution of a plurality of disjointed mobile applications to bring location-based advertising services to mobile devices. In addition, conventional location-based advertising services that primarily rely on GPS or other geolocation tracking have significant difficulties in providing reliable service support for mobile devices that are positioned indoors or non-line-of-sight (NLOS) from GPS satellites or other geolocation signal sources.

Therefore, it may be desirable to provide a novel electronic system and a related method of operation that create and manage a mobile device proximity marketing environment with substantially lower risk to consumers' privacy and device security than conventional location-based advertising services.

Furthermore, it may also be desirable to provide a wireless identification-based mobile device proximity marketing system and a related method of operation that enable improved privacy, data security, and mobile device battery consumption efficiency by utilizing novel alternatives to conventional real-time geolocation tracking of consumer electronics devices via GPS satellite signals or other geographic location-tracking signals.

In addition, it may also be desirable to provide a novel electronic system and a related method of operation that create and manage a mobile device proximity marketing environment, even if consumers' mobile devices are located indoors or non-line-of-sight (NLOS) from GPS satellites or other geolocation signal sources.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a wireless identification (WiD) marketing registry system for mobile device proximity marketing is disclosed. This WiD marketing registry system comprises: a mobile electronic device executing a global WiD mobile application in a CPU and a memory unit of the mobile electronic device, wherein the global WiD mobile application scans for a nearest global WiD marketing signal, extracts a particular global marketing WiD code from the nearest global WiD marketing signal, looks up the particular global marketing WiD code in a global WiD-to-marketing dataset pair database to retrieve a marketing dataset paired to the particular global marketing WiD code, and displays a location proximity marketing content linked to the marketing dataset, which is paired to the particular global marketing WiD code; a WiD signal source device located closest to the mobile electronic device relative to other WiD signal source devices, wherein the WiD signal source broadcasts the nearest global WiD marketing signal to the mobile electronic device; a global WiD marketing registry management system configured to receive a data lookup request from the mobile electronic device for the particular global marketing WiD code, wherein the data lookup request is relayed to the global WiD-to-marketing dataset pair database resident on a computer server, and wherein the marketing dataset paired to the particular global marketing WiD code is retrieved from the global WiD-to-marketing dataset pair database and transmitted to the mobile device; a global WiD registration and update computer terminal connected to the global WiD-to-marketing dataset pair database and the global WiD marketing registry management system for WiD-to-marketing dataset pair registrations, updates, and access privilege management; and a data network connecting the mobile electronic device, the WiD signal source device, the global WiD marketing registry management system, the global WiD-to-marketing dataset pair database, and the global WiD registration and update computer terminal for secure data request and transmission.

In another embodiment of the invention, a method for operating a wireless identification (WiD) marketing registry system is disclosed. This method comprises the steps of: executing a global WiD mobile application from a mobile electronic device; scanning for a plurality of global WiD marketing signals; identifying a nearest global WiD marketing signal broadcasts from a nearest-distance WiD signal source relative to a current position of the mobile electronic device; extracting a particular global marketing WiD code from the nearest global WiD marketing signal; utilizing the particular global marketing WiD code as a key to a lookup table and attempting to retrieve a mobile device proximity marketing dataset; if the mobile device proximity marketing dataset is found from the lookup table, generating an electronic user interface menu on the mobile electronic device via the global WiD mobile application to access or install a specific marketing content linked to the mobile device proximity marketing dataset and the particular global marketing WiD code; and else if the mobile device proximity marketing dataset is not found from the lookup table, removing the nearest global WiD marketing signal from a list of the plurality of global WiD marketing signals decipherable by the global WiD mobile application.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of descriptions of shapes, configurations, and/or other symbolic representations that directly or indirectly resemble one or more global-scale wireless ID marketing registry systems for mobile device proximity marketing and related methods of operating such systems. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention does not inherently indicate any particular order nor imply any limitations in the invention.

For the purpose of describing the invention, a term "wireless identification," or "WiD" in abbreviation, is defined as an electrical signal containing a particular digitized code (i.e. "global marketing WiD code") that can be used as a key to a lookup table and/or a database to retrieve a mobile device proximity-sensitive marketing dataset, such as a device proximity-sensitive URL linked to an advertising webpage or a multimedia ad content. In a preferred embodiment of the invention, WiD may not be a globally-unique identifier, and can be utilized in a plurality of geographic locations with identical or similar themes. For example, a group of identically-branded franchised coffee shops that aspires to deliver same or similar advertising webpages or ad contents to consumers' mobile devices in each of the franchised coffee shops may utilize and share a single WiD across multiple coffee shop locations. The flexibility and the optionally of utilizing one particular WiD in multiple geographical locations for presenting thematically-coherent advertising contents to multiple consumer mobile electronic devices based on device proximity to WiD signal source devices distinguish various embodiments of the present invention from conventional GPS or other geolocation tracking methods that primarily rely on geographically-unique identifiers (UID's).

In addition, for the purpose of describing the invention, a term "WiD signal source device" is defined as an electronic device that generates, broadcasts, and/or transmits a wireless signal containing a global marketing WiD code. Examples of WiD signal source devices include, but are not limited to, wireless routers, Bluetooth transceivers, NFC readers or active NFC tags, smart phones, tablet computers, smart TV's, and other portable electronic devices that can broadcast a wireless signal. The wireless signal may utilize standardized wireless protocols, such as WiLAN (i.e. IEEE 802.11 standard), Bluetooth, NFC, UHF/LF RFID, iBeacon, or cellular communication standards (e.g. 3G, 4G, LTE, etc.), to encode and incorporate the global marketing WiD code.

Moreover, for the purpose of describing the invention, a term "marketing dataset" is defined as a computerized link to an advertising content, such as a uniform resource locator (URL) to the advertising content, or the advertising content itself. The advertising content may be a webpage, a multimedia file containing audio, video, images, and/or computer graphics, or another computerized advertising material.

Furthermore, for the purpose of describing the invention, a term "behavior" is defined as one or more observable, inherent, and/or representative characteristics of an electronic device. For example, a display device's "behavior" refers to the display device's observable characteristics such as displaying a particular content, providing an interactive user interface to a user via a touch screen or another input sensor, enabling mute or un-mute on a speaker connected to the display device, or another device characteristics that are observable, inherent, and/or representative of the display device. In one embodiment of the invention, examples of a display device's behavioral changes include switching to display a new content closely associated with another new content displayed by a user's mobile display device, switching to a different user interface menu on a touch screen due to a dynamic change in the neighboring display device, sensing a different type of user feedback (e.g. from a microphone to a touch sensor, from a webcam to a mouse, from a webcam to an NFC reader, etc.) as a result of a dynamic change in the neighboring display device, or another change of the display device's observable, inherent, and/or representative characteristics.

In addition, for the purpose of describing the invention, terms such as "display content" and "information display content" refers to video or other multimedia information presented by one or more display devices. For example, a change of display content or information display content means replacement or switchover from a first video or a first set of multimedia information to a second video or a second set of multimedia information.

Moreover, for the purpose of describing the invention, a term "cloud network" is defined as a group of computing resources operatively connected to a local network, wherein the group of computing resource may provide networked data storage, data transfers, or another computing-related task to an electronic device situated within the local network. In one example of network configuration, a plurality of display devices may be connected to each other and form a local network, and a user's mobile device near the plurality of display devices and a cloud network may be also connected to this local network. In this example, the cloud network may serve as a remotely-networked data storage or another computing-related resource to one or more display devices in the local network.

In addition, for the purpose of describing the invention, a term "display device" is defined as a dedicated or standalone display unit (e.g. a big-screen LCD monitor, an LCD television, an LED billboard, etc.), a mobile electronic device with an integrated display screen (e.g. a cellular phone, a portable gaming device, a tablet device, etc.), and/or another electronic device with a display screen.

One aspect of an embodiment of the present invention is providing a novel global-scale wireless ID marketing registry system and a related method of operation that create and manage a mobile device proximity marketing environment with substantially lower risk to consumers' privacy and device security than conventional location-based advertising services.

Another aspect of an embodiment of the present invention is providing a novel global-scale wireless ID marketing registry system and a related method of operation that enable improved privacy, data security, and mobile device battery consumption efficiency by utilizing novel alternatives to conventional real-time geolocation tracking of consumer electronics devices via GPS satellite signals or other geographic location-tracking signals.

Yet another aspect of an embodiment of the present invention is providing a novel global-scale wireless ID marketing registry system and a related method of operation that create and manage a mobile device proximity marketing environment, even if consumers' mobile devices are located indoors or non-line-of-sight (NLOS) from GPS satellites or other geolocation signal sources.

Figure 1:
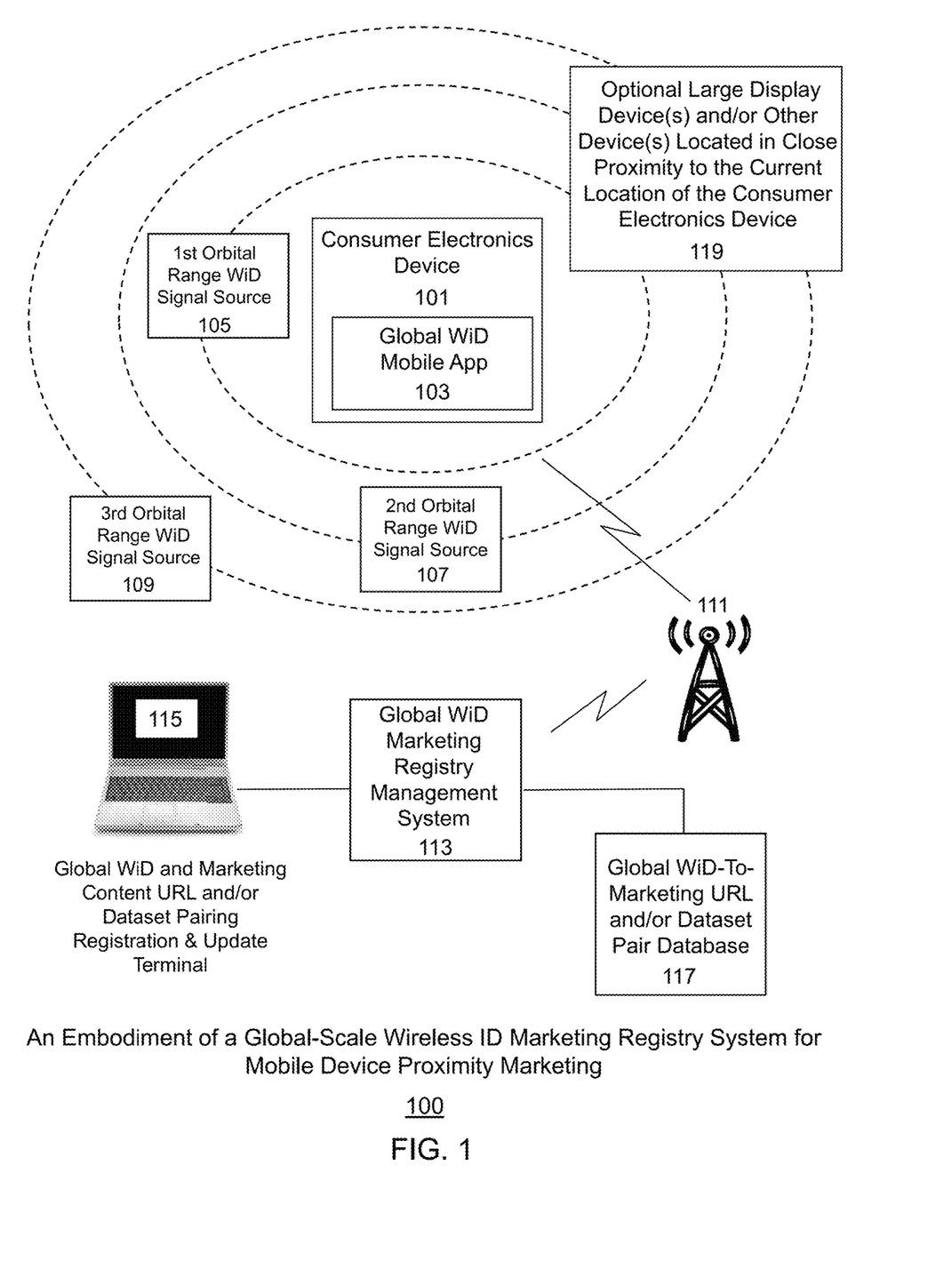
FIG. 1 shows a global-scale wireless ID (WiD) marketing registry system for mobile device proximity marketing, in accordance with an embodiment of the invention.

FIG. 1 shows a global-scale wireless ID (WiD) marketing registry system (100) for mobile device proximity marketing, in accordance with an embodiment of the invention. In a preferred embodiment of the invention, the global-scale wireless ID (WiD) marketing registry system (100) includes one or more WiD signal source devices (105, 107, 109) that broadcast one or more global marketing WiD signals that contain one or more global marketing WiD codes, a global WiD marketing registry management system (113), a global WiD-to-marketing dataset pair database (117), a global WiD and marketing dataset pairing registration and update terminal (115), and a consumer electronics device (101) executing a global WiD mobile application (103) in its CPU/APU and its memory unit, and a wireless data network (111) operatively connecting various elements of the global-scale wireless ID (WiD) marketing registry system (100). Preferably, the wireless data network (111) involves a cellular communication network or another wide-area network (WAN) to provide remote and long-distance communications between the global WiD marketing registry management system (113) and the global WiD mobile application (103) for WiD-to-marketing dataset look ups and retrievals, even though the location proximity marketing provided by the global-scale wireless ID marketing registry system (100) is initially triggered by a close-distance interaction between the consumer electronics device (101) and a broadcasted global WiD marketing signal from a local WiD signal source device (105, 107, or 109), as shown in FIG. 1.

In the embodiment of the invention as shown in FIG. 1, each of the three WiD signal source devices (105, 107, 109) may project an orbital communication range of various distances to communicate with the consumer electronics device (101). For example, the first orbital-range WiD signal source (105) may be provided by a Near-Field Communication (NFC) transceiver unit that has an approximate signal transmission or broadcast range of 30 centimeters relative to the current location of the consumer electronics device (101). Likewise, the second orbital-range WiD signal source (107) may be provided by a Bluetooth transceiver unit that has an approximate signal transmission or broadcast range of 10 meters relative to the current location of the consumer electronics device (101). Similarly, the third orbital-range WiD signal source (109) may be provided by a wireless LAN router that has an approximate signal transmission or broadcast range of 60 meters.

If the consumer electronics device (101) is immersed in a multi-WiD signal source environment with various ranges of wireless communications, as illustrated in FIG. 1, then the global WiD mobile application (103) that scans or "listens" to detect global marketing WiD signals is configured to prioritize and select a global marketing WiD signal source that is physically nearest to the current location of the consumer electronics device (101) for additional processing. In context of the embodiment of the invention as shown in FIG. 1, the global WiD mobile application (103) scans for and selects the first orbital-range WiD signal source (105) among the three WiD signal sources, and then extracts a particular global marketing WiD code from the first orbital-range WiD signal source (105). Subsequently, the global WiD mobile application (103) executed in the consumer electronics device (101) requests the global WiD marketing registry management system (113) and the global WiD-to-marketing dataset pair database (117) to look up the particular global marketing WiD code in the global WiD-to-marketing dataset pair database (117), which returns a corresponding marketing dataset paired with the particular global marketing WiD code in the database, if the global marketing WiD code is found to be associated with the corresponding marketing dataset in the database.

In the preferred embodiment of the invention, the global WiD-to-marketing dataset pair database (117) may incorporate a lookup table or a relational database system that takes the particular global marketing WiD code as a lookup key and retrieves the corresponding marketing dataset as a paired value to the key. The corresponding marketing dataset may be a computerized link to a location proximity marketing content, such as a uniform resource locator (URL) to the location proximity marketing content, or the location proximity marketing content itself. The location proximity marketing content may be a webpage, a multimedia file containing audio, video, images, and/or computer graphics, or another computerized advertising material. In context of the embodiment as shown in FIG. 1, the global WiD mobile application (103) executed in the consumer electronics device (101) is configured to display or play back the location proximity marketing content linked to a URL or retrieved from the global WiD-to-marketing dataset pair database (117).

On the other hand, if the particular global marketing WiD code looked up in the global WiD-to-marketing dataset pair database (117) does not return a legitimate value (i.e. no corresponding marketing dataset associated with the particular global marketing WiD code), then the global WiD mobile application (103) may simply ignore the particular global marketing WiD code that originated from the nearest WiD signal source (e.g. the first orbital-range WiD signal source (105)) from additional processing, and may instead proceed to scan and extract another global marketing WiD code, which is broadcasted by the second-nearest WiD signal source (e.g. the second orbital-range WiD signal source (107)), as illustrated FIG. 1.

Furthermore, in the preferred embodiment of the invention, the global WiD marketing registry management system (113) is configured to initialize, remove, update, and/or manage global marketing WiD codes and any data pairings between the global marketing WiD codes and marketing contents via the global WiD and marketing dataset pairing registration and update terminal (115), wherein the marketing contents may contain location proximity marketing contents or URL's to the location proximity marketing contents. The global WiD and marketing dataset pairing registration and update terminal (115) may be a personal computer or another computerized device operatively connected to the global WiD marketing registry management system (113) and the global WiD-to-marketing dataset pair database (117). In one embodiment of the invention, the global WiD marketing registry management system (113) includes a computer server and a database management operational software that are configured to access, control, and communicate with the global WiD-to-marketing dataset pair database (117) located outside the global WiD marketing registry management system (113). In another embodiment of the invention, the global WiD marketing registry management system (113) may incorporate the global WiD-to-marketing dataset pair database (117) in its computer server and also operate the database management operational software internally.

Moreover, the consumer electronics device (101) in FIG. 1 may be a smart phone, a tablet computer, a notebook computer, an electronic goggle, or another portable electronic device utilized by a highly-mobile consumer, who is capable of readily carrying or moving the consumer electronics device (101) to various locations. In context of an embodiment of the present invention, typical locations where the consumer may carry the consumer electronics device (101) include, but are not limited to, shopping malls, restaurants, sports stadiums, and shops that may locally broadcast global WiD marketing signals, which can be picked up and processed by the global WiD mobile application (103) executed in the consumer electronics device (101) for subsequent database query and location proximity marketing content retrieval.

In addition, in one embodiment of the invention, the global-scale wireless ID marketing registry system for mobile device proximity marketing (100) may also include one or more large display devices and/or other devices (119), which are located in close proximity to the current location of the consumer electronics device (101). These large display devices (i.e. 119) may be configured to communicate with the global WiD mobile application (103) and the global WiD marketing registry management system (113) via wired and/or wireless communication protocols to display supplementary "location proximity marketing" contents.

The supplementary "location proximity marketing" contents displayed by the nearby large display devices (i.e. 119) are time-synchronized with the main "location proximity marketing contents" that are displayed or played back by the global WiD mobile application (103) on the consumer electronics device (101). By presenting time-synchronized supplementary visual and/or audio marketing contents on large display devices while the user is also experiencing the location proximity marketing content retrieved and displayed on a smaller screen of the consumer electronics device (101), the global-scale wireless ID marketing registry system is able to provide a coherent on-demand and multi-screen location proximity marketing, when the user carrying the consumer electronics device (101) approaches a particular location broadcasting a global WiD marketing signal.

Furthermore, in one embodiment of the invention, the global-scale wireless ID marketing registry system for mobile device proximity marketing (100) is configured to associate a plurality of geolocation information (e.g. GPS coordinates, cellular base station ID's, etc.) with the particular global marketing WiD code to differentiate one geographical location from another geographical location, even when the particular global marketing WiD code is utilized to represent multiple geographical locations. The capability to represent multiple geographical locations with a single global marketing WiD code, while retaining finer levels of differentiation provided by the plurality of geolocation information, may be particularly advantageous when the single global marketing WiD code is chosen to represent thematically-coherent entities (e.g. franchise-brand stores or restaurants) in different geographical locations.

In this embodiment, the consumer electronics device (101) approaching a nearest WiD signal source extracts a global marketing WiD code and also detects its current geolocation information, and then transmits both the global marketing WiD code and the current geolocation information of the consumer electronics device (101) to the global WiD marketing registry management system (113). The global WiD marketing registry management system (113) can subsequently retrieve marketing datasets which may be customized or individualized to the unique combination of the global marketing WiD code and the current geolocation information. For example, the location proximity marketing content contained in or linked to the marketing datasets may present a franchise-branded store's locally-exclusive deal advertisements via analysis of the current geolocation information, while simultaneously presenting the franchise brand's nationally-available deals via analysis of the global marketing WiD code that generally corresponds to the franchise brand itself.

Figure 2:
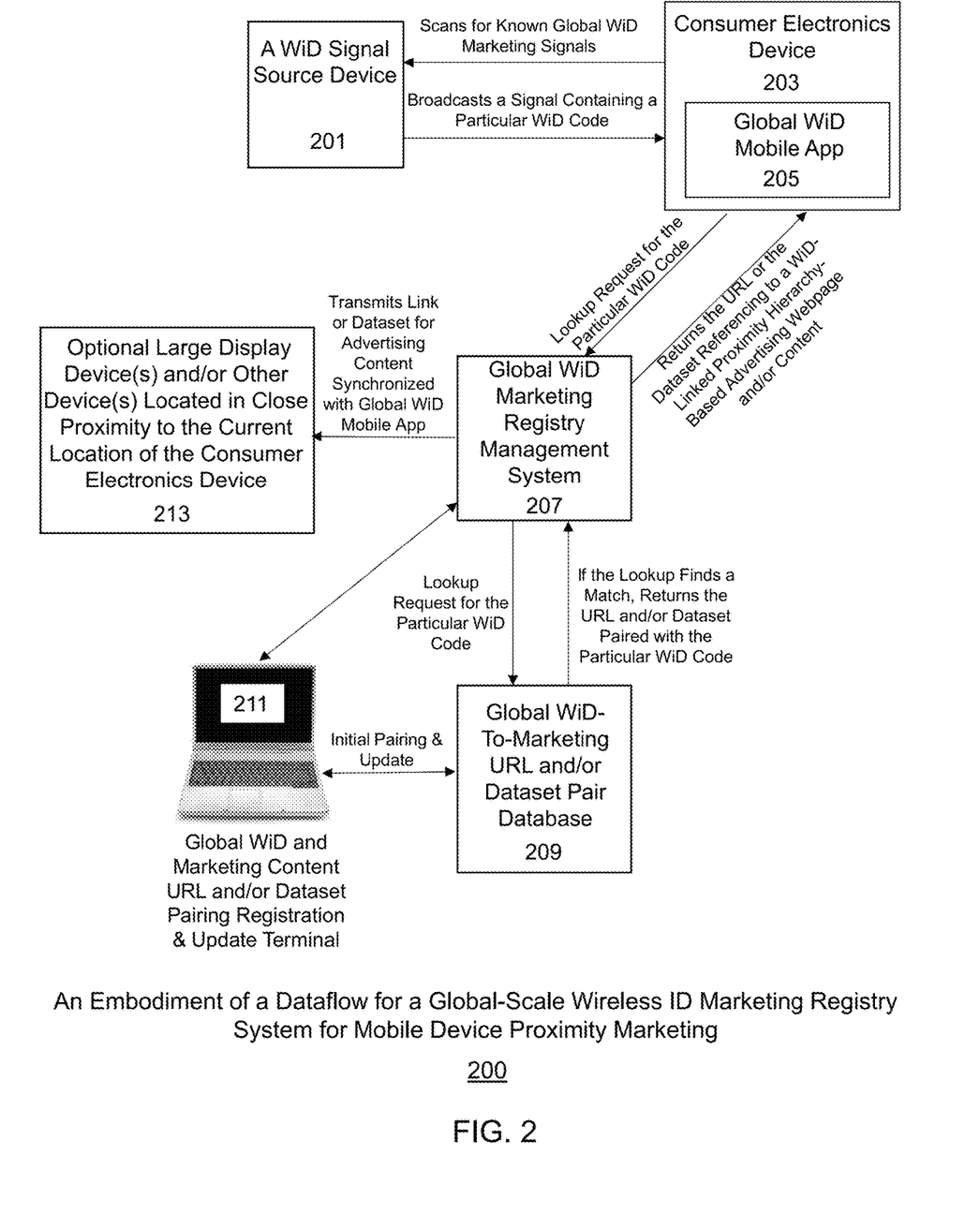
FIG. 2 shows a dataflow diagram for a global-scale wireless ID (WiD) marketing registry system for mobile device proximity marketing, in accordance with an embodiment of the invention.

FIG. 2 shows a dataflow diagram (200) for a global-scale wireless ID (WiD) marketing registry system for mobile device proximity marketing, in accordance with an embodiment of the invention. In this embodiment of the invention, a WiD signal source device (201) in the global-scale wireless ID (WiD) marketing registry system broadcasts a signal containing a particular global marketing WiD code. A consumer electronics device (203) executing a global WiD mobile application (205) is located near the WiD signal source device (201), and scans for known global WiD signals, as shown in FIG. 2.

Then, the global WiD mobile application (205) extracts the particular global marketing WiD code from the nearest global WiD marketing signal, and sends a lookup request for the particular global marketing WiD code to the global WiD marketing registry management system (207). The global WiD marketing registry management system (207) accepts and relays the lookup request to a global WiD-to-marketing dataset pair database (209), which returns a marketing dataset paired to the particular global marketing WiD code to the global WiD marketing registry management system (207), if there is an existing data pairing in the global WiD-to-marketing dataset pair database (209). The marketing dataset may be a mobile device proximity marketing URL address to a location proximity marketing content, or the location proximity marketing content itself. Furthermore, the marketing dataset may also contain or be associated with a current registration status of the particular global marketing WiD code.

As shown in the dataflow diagram (200) diagram in FIG. 2, the marketing dataset determined to be paired with the particular global marketing WiD code is then transmitted to the global WiD mobile application (205) executed in the consumer electronics device (203). Upon receipt of the marketing dataset, the global WiD mobile application (205) can generate or update an electronic user interface displayed on the consumer electronics device (203), and also display or playback the location proximity marketing content referenced by the marketing dataset (e.g. the mobile device proximity marketing URL address).

Furthermore, in one embodiment of the invention, the global-scale wireless ID marketing registry system for mobile device proximity marketing may optionally include one or more large display devices and/or other devices (213), which are located in close proximity to the current location of the consumer electronics device (203). These large display devices may be configured to communicate with the global WiD mobile application (205) and the global WiD marketing registry management system (207) via wired and/or wireless communication protocols to display supplementary "location proximity marketing" contents. For example, the large display devices may receive link or datasets for supplementary advertising contents for big-screen displays, wherein the supplementary advertising contents are time-synchronized with the global WiD mobile application (205) for providing multi-display location proximity advertising effects on the consumer.

The supplementary "location proximity marketing" contents displayed by the nearby large display devices (i.e. 213) are time-synchronized with the main "location proximity marketing contents" that are displayed or played back by the global WiD mobile application (205) on the consumer electronics device (203). By presenting time-synchronized supplementary visual and/or audio marketing contents on large display devices (e.g. 213) while the user is also experiencing the location proximity marketing content retrieved and displayed on a smaller screen of the consumer electronics device (203), the global-scale wireless ID marketing registry system is able to provide a coherent on-demand and multi-screen location proximity marketing, when the user carrying the consumer electronics device (203) approaches a particular location broadcasting a global WiD marketing signal.

In one embodiment of the invention, the global WiD-to-marketing dataset pair database (209) may incorporate a lookup table or a relational database system that takes the particular global marketing WiD code as a lookup key and retrieves the corresponding marketing dataset as a paired value to the key. The corresponding marketing dataset may be a computerized link to a location proximity marketing content, such as a uniform resource locator (URL) to the location proximity marketing content, or the location proximity marketing content itself. The location proximity marketing content may be a webpage, a multimedia file containing audio, video, images, and/or computer graphics, or another computerized advertising material. In context of the embodiment as shown in FIG. 2, the global WiD mobile application (205) executed in the consumer electronics device (203) is configured to display or play back the location proximity marketing content linked to the URL or retrieved directly from the global WiD-to-marketing dataset pair database (209).

On the other hand, if the particular global marketing WiD code looked up in the global WiD-to-marketing dataset pair database (209) does not return a legitimate value (i.e. no corresponding marketing dataset associated with the particular global marketing WiD code), then the global WiD mobile application (205) may simply ignore the particular global marketing WiD code that originated from the WiD signal source device (201) from additional processing, and may instead proceed to scan and extract another global marketing WiD code, which is broadcasted by a second-nearest WiD signal source.

Furthermore, in the dataflow diagram (200) as shown in FIG. 2, the global WiD marketing registry management system (207) is configured to initialize, remove, update, and/or manage global marketing WiD codes and any data pairings between the global marketing WiD codes and marketing contents via the global WiD and marketing dataset pairing registration and update terminal (211), wherein the marketing contents may contain location proximity marketing contents or URL's to the location proximity marketing contents. The global WiD and marketing dataset pairing registration and update terminal (211) may be a personal computer or another computerized device operatively connected to the global WiD marketing registry management system (207) and the global WiD-to-marketing dataset pair database (209). In one embodiment of the invention, the global WiD marketing registry management system (207) includes a computer server and a database management operational software that are configured to access, control, and communicate with the global WiD-to-marketing dataset pair database (209) located outside the global WiD marketing registry management system (207). In another embodiment of the invention, the global WiD marketing registry management system (207) may incorporate the global WiD-to-marketing dataset pair database (209) in its computer server and also operate the database management operational software internally.

Moreover, the consumer electronics device (203) in FIG. 2 may be a smart phone, a tablet computer, a notebook computer, an electronic goggle, or another portable electronic device utilized by a highly-mobile consumer, who is capable of readily carrying or moving the consumer electronics device (203) to various locations. In context of an embodiment of the present invention, typical locations where the consumer may carry the consumer electronics device (203) include, but are not limited to, shopping malls, restaurants, sports stadiums, and shops that may locally broadcast global WiD marketing signals, which can be picked up and processed by the global WiD mobile application (205) executed in the consumer electronics device (203) for subsequent database query and location proximity marketing content retrieval.

Figure 3:
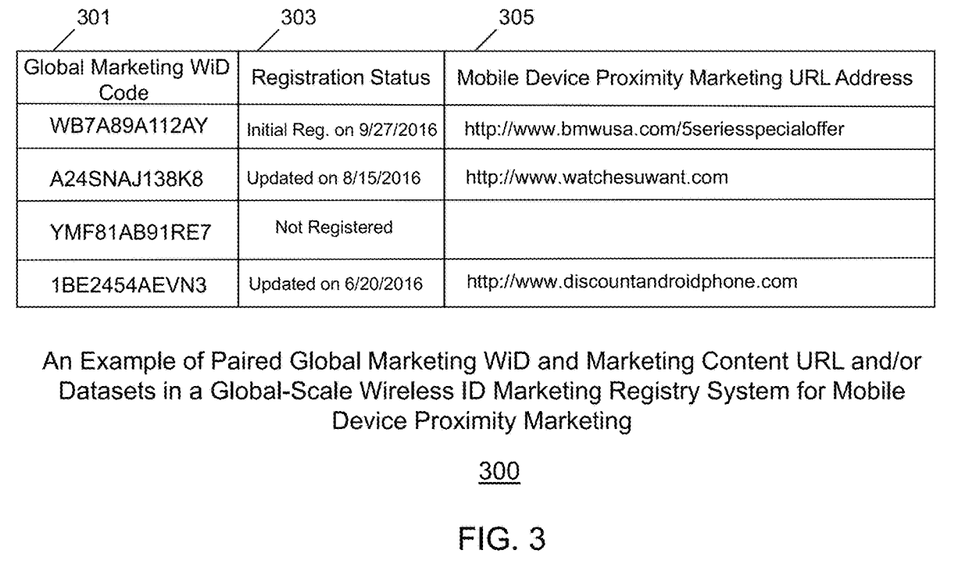
FIG. 3. shows an example of paired global marketing WiD and marketing content URL and/or datasets in a global-scale wireless ID marketing registry system for mobile device proximity marketing, in accordance with an embodiment of the invention.

FIG. 3. shows a data table example (300) of paired global marketing WiD and marketing content URL and/or datasets in a global-scale wireless ID marketing registry system for mobile device proximity marketing, in accordance with an embodiment of the invention. In this data table example (300), each table entry comprises a global marketing WiD code (301), a registration status (303), and a mobile device proximity marketing URL address (305). The global marketing WiD code (301) may be an alphanumeric identifier that identifies and links a specific location proximity marketing content for display or playback on a consumer's mobile electronic device. In a global WiD-to-marketing dataset pair database, as previously shown in FIGS. 1-2, the global marketing WiD code (301) can be initialized, registered, and updated, whenever new location proximity marketing contents or URL's to such contents are initialized, registered, and updated with the global WiD-to-marketing dataset pair database.

As shown by each table entry in FIG. 3, the registration status (303) includes information such as an initial registration date, a registration update date, or a non-registration status (i.e. a pre-initialized status or a "code not found" status). Furthermore, each table entry may also include a specific marketing dataset, such as a mobile device proximity marketing URL address (305) to a location proximity marketing content, or the location proximity marketing content itself. The location proximity marketing content may be a webpage, a multimedia file, or another computerized content that contains location proximity marketing information.

Furthermore, in one embodiment of the invention, the data table for the paired global marketing WiD and marketing content URL and/or datasets may also be associated with a global marketing WiD code scan history, which is linked to a plurality of consumer mobile devices for a particular global marketing WiD code. The global marketing WiD code scan history includes any products viewed or purchased via the location proximity marketing content, and such consumer trend information can be subsequently utilized for producing statistical analysis associated with mobile device consumer behaviors.

Figure 4:
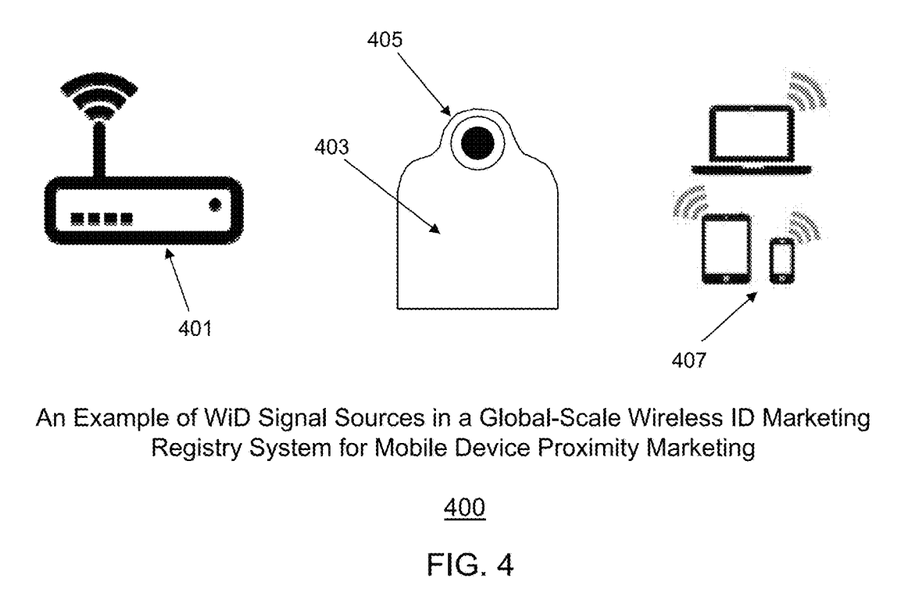
FIG. 4 shows an example of WiD signal sources in a global-scale wireless ID marketing registry system for mobile device proximity marketing, in accordance with an embodiment of the invention.

FIG. 4 shows an example (400) of WiD signal sources in a global-scale wireless ID marketing registry system for mobile device proximity marketing, in accordance with an embodiment of the invention. The WiD signal sources may originate from a wireless router (401), an RFID tag (403) with an active or passive electronic circuitry (405) for accessing or changing RFID tag-stored information, or another wirelessly-accessible electronic device (407), such as a smart TV, a tablet computer, a notebook computer, or another portable electronic device utilized for the purpose of broadcasting WiD signal sources to nearby consumer-held mobile electronic devices.

Preferably, the WiD signal sources may utilize industry standard wireless protocols, such as NFC, Bluetooth, UHF-RFID, LF-RFID, wireless LAN (e.g. IEEE 802.11), or iBeacon, to broadcast or transmit global WiD marketing signals. Furthermore, in one embodiment of the invention, the WiD signal source devices (e.g. 401, 403, 407) are operatively connected to a global WiD marketing registry management system and a global WiD-to-marketing dataset pair database to download and update specific global WiD marketing signals for broadcasting to a nearby consumer mobile electronic device. The change of a first global WiD marketing signal containing a first global marketing WiD code to another global WiD marketing signal containing a second global marketing WiD code in a WiD signal source device is dependent on dynamic changes to global marketing schemes (e.g. changes in ownership of advertisers or ad sponsors, changes in ownership or types of stores, etc). In one embodiment of the invention, an operator of the global WiD marketing registry management system is able to change global marketing WiD codes contained in global WiD marketing signals dynamically and remotely, and initiate corresponding updates in WiD signal source devices that are located inside or near designated stores, buildings, restaurants, stadiums, or other designated locations for location proximity marketing to consumer mobile devices.

Figure 5:
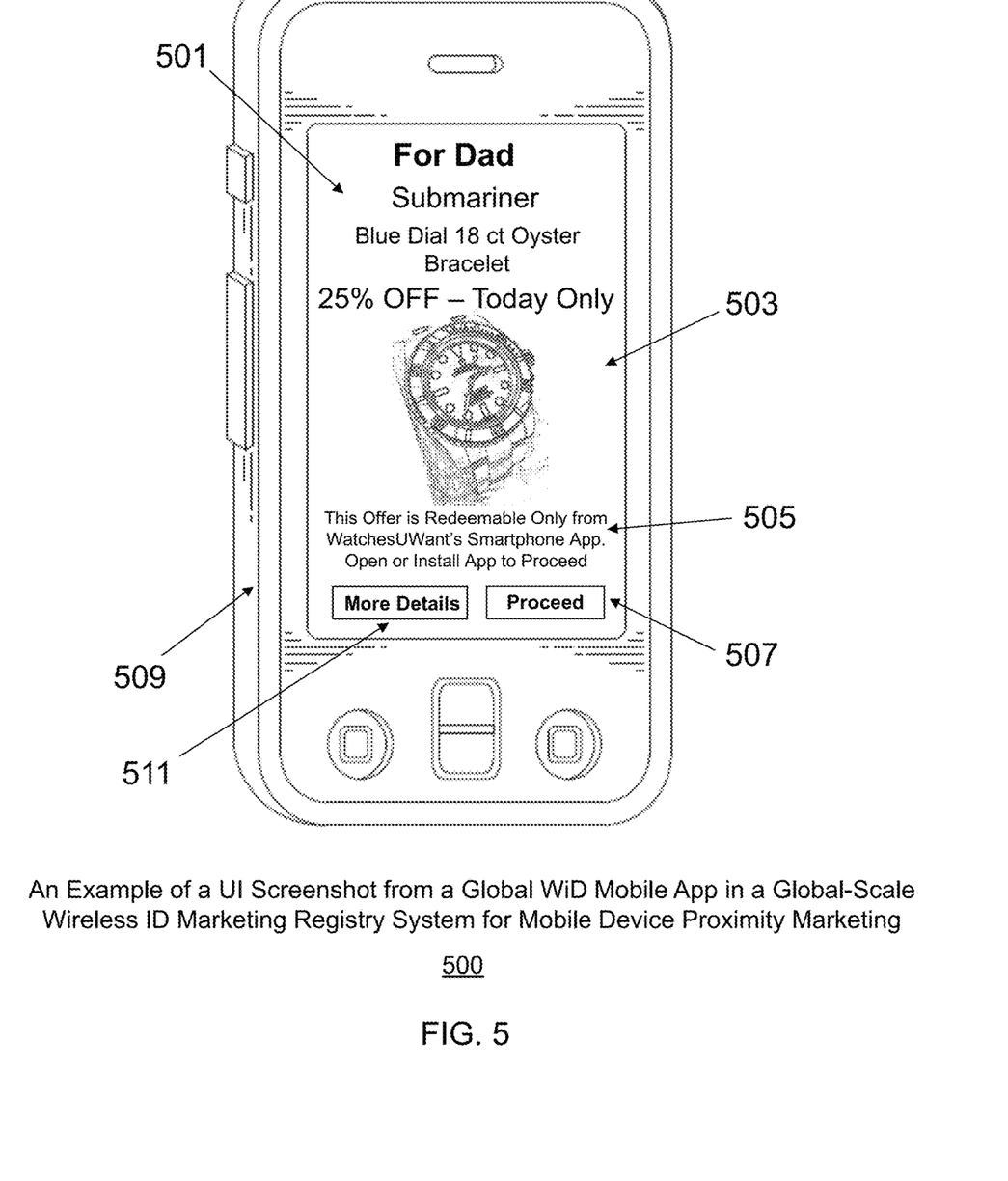
FIG. 5 shows an example of a user interface screenshot from a global WiD mobile application in a global-scale wireless ID marketing registry system for mobile device proximity marketing, in accordance with an embodiment of the invention.

FIG. 5 shows an example of a user interface screenshot (500) from a global WiD mobile application (501) in a global-scale wireless ID marketing registry system for mobile device proximity marketing, in accordance with an embodiment of the invention. This user interface screenshot (500) illustrates a visual display and presentation stage of a location proximity marketing content that was derived or downloaded from a proximity marketing URL address or another marketing dataset, which were paired with a particular global marketing WiD code extracted from a nearby global WiD marketing signal.

In a preferred embodiment of the invention, the global WiD mobile application (501) is executed in a CPU/APU and a memory unit of a portable consumer electronics device (509), such as a smart phone or a tablet computer. After the particular global marketing WiD code is extracted from the nearby global WiD marketing signal, the global WiD mobile application (501) transmits the particular global marketing WiD code to a global WiD marketing registry management system and a global WiD-to-marketing dataset pair database to find a marketing dataset that corresponds to the particular global marketing WiD code. Typically, the marketing dataset contains a proximity marketing URL address that enables the global WiD mobile application (501) to display a location proximity marketing content webpage or to playback a multimedia file on its electronic user interface.

In context of the example illustrated in FIG. 5, the user interface screenshot (500) from the global WiD mobile application (501) shows a Father's Day advertising content with a graphical rendering (503) section and a textual description (505) for a men's watch as a potential gift idea, when the portable consumer electronics device (509) approaches a jewelry shop in a physical shopping mall. The jewelry shop, in this example, has a WiD signal source device installed inside or near the boundary of the jewelry shop that broadcasts a global WiD marketing signal, which is paired with the Father's Day advertising content with the graphical rendering (503) section and the textual description (505) of the men's watch offered by the jewelry shop. As the consumer holding the portable consumer electronics device (509) comes near the jewelry shop, the global WiD mobile application (501) picks up the global WiD marketing signal, extracts a global marketing ID code specific to the jewelry shop, queries the global WiD marketing registry management system and the global WiD-to-marketing dataset pair database, retrieves a corresponding marketing dataset that links to the Father's Day advertising content, and displays the graphical rendering (503) section and the textual description (505) of the Father's Day advertising content on its electronic user interface, as shown in FIG. 5.

Furthermore, in this example, the electronic user interface also displays additional user navigational options associated with the Father's Day advertising content with a "More Details" button (511) and a "Proceed" button (507). The "More Details" button (511), when invoked, can provide more graphical images, descriptions, or related products for the Father's Day. The "Proceed" button (507), on the other hand, can lead the user to make a purchase interest inquiry or an online purchase via a mobile e-commerce interface. In addition, the "Proceed" button may also invoke opening or installation of a separate mobile application for the jewelry shop or its product offerings.

Figure 6:
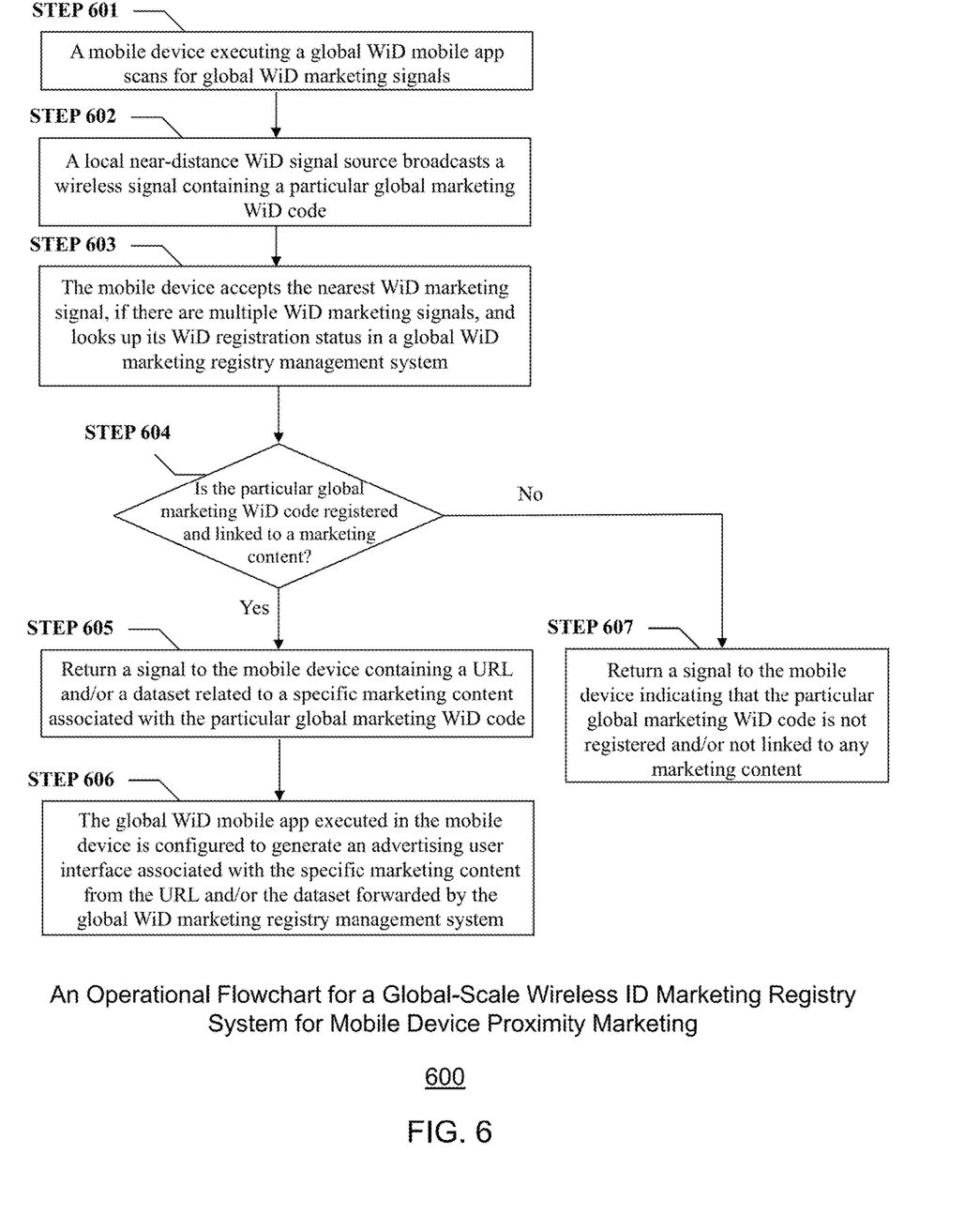
FIG. 6 shows an operational flowchart for a global-scale wireless ID marketing registry system for mobile device proximity marketing, in accordance with an embodiment of the invention.

FIG. 6 shows an operational flowchart (600) for a global-scale wireless ID marketing registry system for mobile device proximity marketing, in accordance with an embodiment of the invention. In this operational flowchart (600), a consumer-operated mobile electronic device executes a global WiD mobile application, which periodically or continuously scans for global WiD marketing signals, as shown in STEP 601. Independent of any actions from the consumer-operated mobile electronic device, a local near-distance WiD signal source device broadcasts a wireless signal containing a particular global marketing WiD code, as shown in STEP 602. The consumer-operated mobile electronic device accepts the nearest or the strongest WiD marketing signal, if there are multiple WiD marketing signals in the vicinity, and then extracts the particular global marketing WiD code, which is transmitted to a global WiD marketing registry management system, as shown in STEP 603.

Then, the global WiD marketing registry management system looks up the WiD registration status of the particular global marketing WiD code in a database linked to the global WiD marketing registry management system, as also shown in STEP 603. If the particular global marketing WiD code is registered and linked to a marketing content (e.g. a mobile device proximity marketing dataset, a URL to the mobile device proximity marketing dataset, etc.), as shown STEP 604, then the global WiD marketing registry management system returns a signal to the consumer-operated mobile electronic device, wherein the signal contains the URL to the mobile device proximity marketing dataset or the mobile device proximity marketing dataset itself, as shown in STEP 605.

Subsequently, the global WiD mobile application executed on the consumer-operated mobile electronic device generates an advertising user interface from the URL to the mobile device proximity marketing dataset, or from the mobile device proximity marketing dataset itself, as shown in STEP 606. The mobile device proximity marketing dataset may be a current user location-sensitive advertising webpage, a multimedia file, or another computerized advertising content that is specifically customized for the particular global marketing WiD code broadcasted originally from the local near-distance WiD signal source device, which was situated in close physical proximity to the consumer-operated mobile electronic device.

On the other hand, if the particular global marketing WiD code is not registered, found, and/or linked to a marketing content upon completion of the data lookup query in the database, the global WiD marketing registry management system returns a signal to the consumer-operated mobile electronic device to indicate that the particular global marketing WiD code is not registered, found, or linked to any marketing contents, as shown in STEP 607. In such situations, the global WiD mobile application executed on the consumer-operated mobile electronic device typically moves on to scanning or processing other nearby global WiD marketing signals. Preferably, the next global WiD marketing signal to be scanned and processed is the second-nearest or the second-strongest global WiD marketing signal, if there are a plurality of global WiD marketing signals in the vicinity of the consumer-operated mobile electronic device.

Various embodiments of the global-scale wireless ID marketing registry systems and the methods for operating such systems have been illustrated in FIGS. 1-6 and described above. The present invention provides several advantages over conventional location-based services. Unlike conventional location-based service solutions that typically necessitate turning GPS or location tracker on and lowering privacy protection levels to enable localized two-way communications with unknown devices, various embodiments of the present invention simply requires one-way listening from a consumer-operated mobile device to detect a nearby "global marketing signal broadcast" that contains a particular global marketing wireless identification code. Subsequent processing of the nearby global marketing signal does not necessitate two-way communication with a potentially-dangerous local device that broadcasted the global marketing signal. In many real-life circumstances, the local device may or may not be a trustworthy device from the perspective of the consumer-operated mobile device. Instead of attempting to reply back to the local device directly, the global marketing signal picked up by the consumer-operated mobile device is further checked for veracity, security, and validity via a global-scale WiD registry database that can compare the particular global marketing wireless identification code extracted from the global marketing signal with registered codes, before initiating any location proximity marketing on the consumer-operated mobile device. Therefore, various embodiments of the present invention provide a novel mobile device proximity marketing environment with substantially lower risk to consumers' privacy and device security than conventional location-based advertising services.

Furthermore, another advantage of an embodiment of the present invention is providing a wireless identification-based (i.e. WiD) mobile device proximity marketing system and a related method of operation that enable improved privacy, data security, and mobile device battery consumption efficiency by utilizing novel alternatives (i.e. globally-recognized and locally-broadcasted WiD codes) to conventional real-time geolocation tracking of consumer electronics devices via GPS satellite signals or other geographic location-tracking signals alone.

In addition, another advantage of an embodiment of the present invention is that the global-scale wireless ID marketing registry system can create and manage a mobile device proximity marketing environment by utilizing a novel concept of broadcasting global marketing WiD signals from local devices in close proximity to a consumer-operated mobile device, even if the consumer-operated mobile device is located indoors or non-line-of-sight (NLOS) from GPS satellites or other geolocation signal sources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A wireless identification (WiD) marketing registry system for mobile device proximity marketing, the WiD marketing registry system comprising:
a mobile electronic device executing a global WiD mobile application in a CPU and a memory unit of the mobile electronic device, wherein the global WiD mobile application scans for a nearest orbital-range global WiD marketing signal, extracts a first particular global marketing WiD code from the nearest orbital-range global WiD marketing signal, looks up the first particular global marketing WiD code in a global WiD-to-marketing dataset pair database, and fails to return a decodable marketing value as no corresponding marketing dataset is associated with the first particular global marketing WiD code, after which the global WiD mobile application freshly scans for a second time to detect a second nearest orbital-range global WiD marketing signal, extracts a second particular global marketing WiD code from the second nearest orbital-range global WiD marketing signal, looks up the second particular global marketing WiD code in the global WiD-to-marketing dataset pair database, and successfully retrieves a marketing dataset paired to the second marketing WiD code to display a location proximity marketing content linked to the marketing dataset, wherein the second particular global marketing WiD code extracted from the second nearest orbital-range global WiD marketing signal is an equipment and network name-agnostic global marketing identifier, which is unrelated to zones categorized by network names and device identifiers, for a business organization to symbolize a same franchise marketing theme or a same brand marketing theme regardless of the zones categorized by the network names and the device identifiers, and wherein the second particular global marketing WiD code is shared and broadcasted across multiple WiD signal source devices in multiple locations associated with the same franchise marketing theme or the same brand marketing theme;
a first WiD signal source device emitting the nearest orbital-range global WiD marketing signal, and a second WiD signal source device emitting the second nearest orbital-range global WiD marketing signal, wherein the second WiD signal source is located at an outer orbit relative to an inner orbit of the first WiD signal source, which is closer to the mobile electronic device than the second WiD signal source;
a global WiD marketing registry management system configured to receive a data lookup request from the mobile electronic device for a global marketing WiD code, wherein the data lookup request is relayed to the global WiD-to-marketing dataset pair database resident on a computer server, and wherein the marketing dataset paired to the second particular global marketing WiD code is retrieved from the global WiD-to-marketing dataset pair database and transmitted to the mobile device;
a global WiD registration and update computer terminal connected to the global WiD-to-marketing dataset pair database and the global WiD marketing registry management system for WiD-to-marketing dataset pair registrations, updates, and access privilege management; and
a data network connecting at least two of the mobile electronic device, the first WiD signal source device, the second WiD signal source device, the global WiD marketing registry management system, the global WiD-to-marketing dataset pair database, and the global WiD registration and update computer terminal for secure data request and transmission.

2. The wireless identification (WiD) marketing registry system of claim 1, further comprising an electronic user interface generated by the global WiD mobile application on a display panel of the mobile electronic device to allow a user to access or install the location proximity marketing content originating from the marketing dataset paired to the second particular global marketing WiD code.

3. The wireless identification (WiD) marketing registry system of claim 1, wherein the second nearest orbital-range global WiD marketing signal utilizes NFC, Bluetooth, RFID, wireless LAN, or iBeacon.

4. The wireless identification (WiD) marketing registry system of claim 1, wherein the mobile electronic device is a smart phone, a tablet computer, a notebook computer, a wearable electronic goggle, or a portable game device.

5. The wireless identification (WiD) marketing registry system of claim 1, wherein the marketing dataset is linked to a webpage containing the location proximity marketing content or a mobile app installation process for accessing the location proximity marketing content.

6. The wireless identification (WiD) marketing registry system of claim 1, wherein the global WiD-to-marketing dataset pair database contains a plurality of datasets, with each dataset containing a global marketing WiD alphanumeric code, a mobile device proximity marketing URL address, and a registration status, and wherein the global marketing WiD alphanumeric code provides a layer of abstraction and security control from an uninvited access of the mobile device proximity marketing URL address.

7. The wireless identification (WiD) marketing registry system of claim 1, wherein the first WiD signal source device or the second WiD signal source device is a wireless router, an RFID tag, or another wirelessly-accessible electronic device.

8. The wireless identification (WiD) marketing registry system of claim 1, wherein the global WiD-to-marketing dataset pair database further adds a plurality of geolocation information on the second particular global marketing WiD code to differentiate one location from another when the second particular global marketing WiD code is utilized to represent both locations.

9. The wireless identification (WiD) marketing registry system of claim 1, further comprising a global marketing WiD code scan history linked to a plurality of mobile devices for the second particular global marketing WiD code, wherein the global marketing WiD code scan history, which includes any products viewed or purchased via the location proximity marketing content, is updated and stored in the global WiD-to-marketing dataset pair database, and wherein the global marketing WiD code scan history is subsequently utilized for producing statistical analysis associated with mobile device consumer behaviors.

10. The wireless identification (WiD) marketing registry system of claim 1, further comprising a stationary large display device or a stationary audio system located near the mobile electronic device, wherein the stationary large display device or the stationary audio system also receives the marketing dataset paired to the second particular global marketing WiD code from the global WiD-to-marketing dataset pair database, and displays or plays back the location proximity marketing content linked to the marketing dataset.

11. A method for operating a wireless identification (WiD) marketing registry system, the method comprising the steps of:
executing a global WiD mobile application from a mobile electronic device;
scanning for a plurality of global WiD marketing signals;
identifying a nearest orbital-range global WiD marketing signal broadcasted from a nearest-distance WiD signal source relative to a current position of the mobile electronic device;
extracting a first particular global marketing WiD code from the nearest orbital-range global WiD marketing signal, wherein the first particular global marketing WiD code extracted from the nearest orbital-range global WiD marketing signal is an equipment and network name-agnostic global marketing identifier;
utilizing the first particular global marketing WiD code as a first key to a lookup table;
failing to return a decodable marketing value when the first particular global marketing WiD code is used as the first key to the lookup table;
identifying a second nearest orbital-range global WiD marketing signal broadcasted from a second nearest-distance WiD signal source, which is farther away from the current position of the mobile electronic device, compared to the nearest-distance WiD signal source that generated the nearest orbital-range global WiD marketing signal;
extracting a second particular global marketing WiD code from the second nearest orbital-range global WiD marketing signal, wherein the second particular global marketing WiD code extracted from the second nearest orbital-range global WiD marketing signal is a second equipment and network name-agnostic global marketing identifier;
utilizing the second particular global marketing WiD code as a second key to the lookup table and successfully retrieving a mobile device proximity marketing dataset as a lookup table return value; and
when the mobile device proximity marketing dataset is found from the lookup table, generating an electronic user interface menu on the mobile electronic device via the global WiD mobile application to access or install a specific marketing content linked to the mobile device proximity marketing dataset and the second particular global marketing WiD code.

12. The method of claim 11, wherein the lookup table is part of a global WiD-to-marketing dataset pair database resident on a computer server.

13. The method of claim 11, wherein the mobile electronic device is a smart phone, a tablet computer, a notebook computer, a wearable electronic goggle, or a portable game device.

14. The method of claim 11, wherein the second nearest orbital-range global WiD marketing signal utilizes NFC, Bluetooth, RFID, wireless LAN, or iBeacon.

15. The method of claim 12, wherein the global WiD-to-marketing dataset pair database contains a plurality of datasets, with each dataset containing a global marketing WiD alphanumeric code, a mobile device proximity marketing URL address, and a registration status, and wherein the global marketing WiD alphanumeric code provides a layer of abstraction and security control from an uninvited access of the mobile device proximity marketing URL address.

16. The method of claim 11, wherein the second nearest-distance WiD signal source is a wireless router, an RFID tag, or another wirelessly-accessible electronic device.

17. The method of claim 12, wherein the global WiD-to-marketing dataset pair database further adds a plurality of geolocation information on the second particular global marketing WiD code to differentiate one location from another even when the second particular global marketing WiD code is utilized to represent both locations.

18. The method of claim 12, wherein the global WiD-to-marketing dataset pair database further comprises a global marketing WiD code scan history linked to a plurality of mobile devices for the second particular global marketing WiD code, wherein the global marketing WiD code scan history, which includes any products viewed or purchased via the location proximity marketing content, is updated and stored in the global WiD-to-marketing dataset pair database, and wherein the global marketing WiD code scan history is subsequently utilized for producing statistical analysis associated with mobile device consumer behaviors.

* * * * *